UNITED STATES PATENT OFFICE.

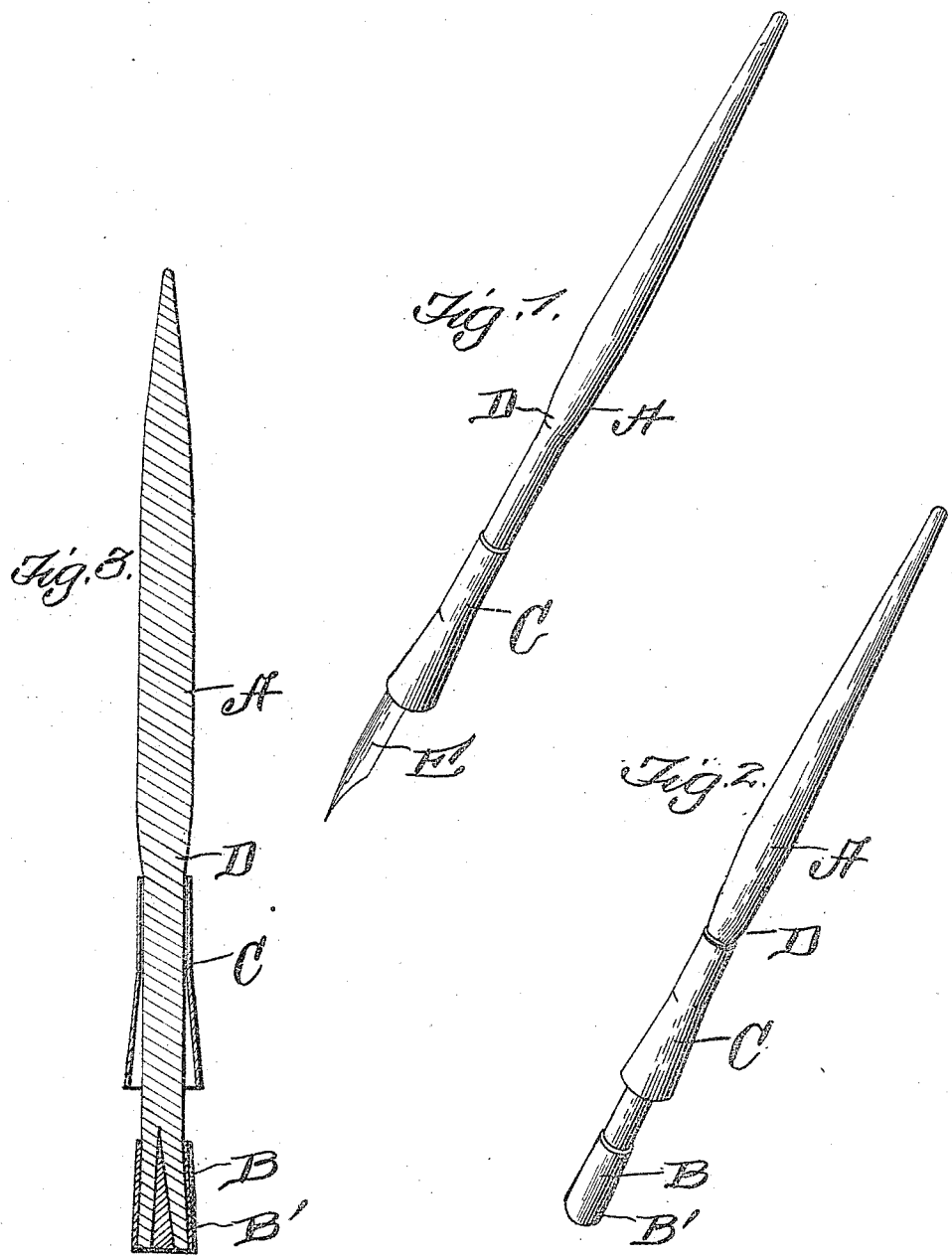

JOSEPH M. GEIGER, OF WORMLEYSBURG, PENNSYLVANIA.

PENHOLDER.

948,852.  Specification of Letters Patent.  Patented Feb. 8, 1910.

Application filed June 29, 1909. Serial No. 505,053.

*To all whom it may concern:*

Be it known that I, JOSEPH M. GEIGER, a citizen of the United States, residing at Wormleysburg, in the county of Cumberland and State of Pennsylvania, have invented certain new and useful Improvements in Penholders; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in penholders and comprises a simple and efficient device of this nature containing various details of construction and arrangements of parts which will be hereinafter fully described and then specifically defined in the appended claim.

I illustrate my invention in the accompanying drawings in which:—

Figure 1 is a perspective view of the holder made in accordance with my invention. Fig. 2 is a view showing the movable ferrule at its farthest inner throw, and Fig. 3 is a longitudinal sectional view through the parts slightly exaggerated to better illustrate details of the invention.

Reference now being had to the details of the drawings by letter, A designates the shank portion of the penholder which may be made of any material, and B designates a fixed ferrule fitted over one end thereof, said ferrule having its outer end flaring slightly as at B'.

C designates a movable ferrule which is cylindrical substantially half its length and its other or outer half toward the end to which the ferrule B is fastened flaring and adapted to telescope over the ferrule B. The flaring end B' of the ferrule will serve to prevent the ferrule C from passing entirely over the ferrule B by reason of the flaring portion B' coming in contact with the cylindrical portion of the ferrule C.

The shank portion of the penholder has a central bulging portion D against which the inner end of the ferrule C is adapted to contact to limit its movement in one direction. It will thus be seen that, by the provision of said bulging portion upon the body portion of the penholder and the flaring part of the portion D, the ferrule C will be securely held upon the penholder but allowed to have a slight longitudinal movement.

The pen, designated by letter E, it will be noted is placed over the ferrule B and the ferrule C moved over the pen, causing the latter to be gripped by the two flaring portions of the ferrules, thus securely holding the pen in place. The pen is released in the usual manner by causing the ferrule C to be moved rearward.

By the provision of a penholder as shown and described, a simple and efficient means is afforded whereby a pen may be securely gripped and held by a penholder, the pen being gripped only at the points between the flaring parts of the two ferrules, thus allowing the pen to be easily removed without the ferrules and the pen adhering together by rust, etc., as is commonly the case in the usual form of penholders.

What I claim to be new is:—

A penholder having a shank portion, cylindrical a portion of its length and having a flaring end, a ferrule fitted to the latter, a shell cylindrical in outline a portion of its length and adapted to slide upon the cylindrical portion of the penholder, one end of said shell being conical shape and adapted to telescope over said ferrule and coöperating with the latter to frictionally hold and engage a pen, the inner end of said cylindrical part of the holder outwardly flaring and forming a stop to limit the movement of the shell in one direction.

In testimony whereof I hereunto affix my signature in the presence of two witnesses.

JOSEPH M. GEIGER.

Witnesses:
B. F. RAPP,
W. H. GEIGER.